United States Patent [19]
Blais

[11] Patent Number: 4,800,270
[45] Date of Patent: Jan. 24, 1989

[54] GALVANOMETRIC OPTICAL SCANNING SYSTEM HAVING A PAIR OF CLOSELY LOCATED SYNCHRONIZATION

[75] Inventor: Francois Blais, Vanier, Canada

[73] Assignee: Canadian Patents & Development Ltd., Ottawa, Canada

[21] Appl. No.: 134,683

[22] Filed: Dec. 18, 1987

Related U.S. Application Data

[63] Continuation-in-part of Ser. No. 65,386, Jun. 23, 1987.

[51] Int. Cl.$^4$ .............................................. H01J 3/14
[52] U.S. Cl. ................................... 250/235; 350/6.61; 350/6.91; 358/293
[58] Field of Search ........... 250/234, 235, 236, 201 R; 350/6.5, 6.6, 6.7, 6.8, 6.91; 358/293, 206, 208

[56] References Cited

U.S. PATENT DOCUMENTS 4,686,363  8/1987  Schoon ................................. 250/236
4,700,066 10/1987  Horikawa ............................. 250/235

Primary Examiner—Edward P. Westin
Assistant Examiner—Khaled Shami
Attorney, Agent, or Firm—Yoshiharu Toyooka

[57] ABSTRACT

A galvanometric optical scanning system is disclosed. In order to compensate errors in phase, zero drift etc., beam position detection means is provided in an optical path of scanning beam of light and comprises a pair of closely located photodetectors. The pulses produced by the beam position detection means are processed to generate correction signals for various compensations.

8 Claims, 6 Drawing Sheets

GALVANOMETRIC OPTICAL SCANNING SYSTEM HAVING A PAIR OF CLOSELY LOCATED SYNCHRONIZATION

This is a continuation-in-part of application Ser. No. 07/065,386 filed June 23, 1987.

FIELD OF THE INVENTION

The present invention relates to a galvanometric scanning system and more particularly to a galvanometric scanning system including beam position detection means for compensating errors caused by phase variation, zero drift, gain fluctuation etc.

BACKGROUND OF THE INVENTION

Galvanometer mirrors have been widely used as light deflectors in various optical scanning devices, e.g. optical imaging devices, light projecting devices, non-impact optical printers in the art, the galvanometer mirror is angularly moved in reciprocating strokes when a sawtooth sinusoidal or other repetitive current is supplied to the mirror drive.

An excellent example of the optical scanning for imaging is found in U.S. Pat. No. 4,627,734, Dec. 9, 1986 (Rioux). In his patent, Rioux describes an optical three dimensional imaging system using a laser synchronous scanner which scans an object by a beam of light and receives synchronously scattered light from the object. By processing the received scattered light signal, a three dimensional image is reconstructed.

In U.S. Pat. No. 4,648,685, Mar. 10, 1987 Fukai et al, a specifically designed sawtooth voltage waveform is employed to scan a flat surface at variable speeds for different directions.

For data gathering and image reproduction by optical scanning, it is necessary to synchronize the scanner to external drive electronics and to generate a pixel clock to strobe data either in or out of user hardware. Although low cost microprocessors and high speed complex logic elements have made this easier and more affordable, such synchronization with accuracy and precision is still complex.

Many patents describe variety of techniques for resolving various problems encountered in galvanometric scanners.

U.S. Pat. No. 4,127,781, Nov. 28, 1978 (Sato), for example, teaches a system for determining accurately the position of the scanning mirror. It uses a rectangular uniformily distributed light which is reflected from the back surface of the mirror across a plurality of parallel photovoltaic diode structure bars.

U.S. Pat. No. 4,044,248, Aug. 23, 1977 (Glassnian), on the other hand, describes a method and an apparatus for linearizing a mirror galvanometer. The patent uses a transmission grating in the path of the beam. The grating modulates the scanned beam in accordannce with the velocity of scan of the light beam. A control signal is produced by processing the output from a photocell monitoring the scanned beam and is combined with a reference driving signal to deflect the mirror in linear fashion.

OBJECTS OF THE INVENTION

It is therefore an object of the present invention to provide a galvanometric scanner which is compensated for various errors.

It is another object of the invention to provide a galvanometric scanner which is compensated for phase variations zero drift etc.

It is still another object of the present invention to provide a galvanometric scanner which include beam position detection means which generates synchronization pulses for various error compensations.

SUMMARY OF THE INVENTION

Briefly stated, a galvanometric optical scanning system, according to one embodiment of the present invention includes a scanning mirror rotatably supported on an axis and a mirror drive means for driving the scanning mirror in an angularly reciprocating fashion about the axis. The system further includes a light source for projecting a beam of light towards the scanning mirror to scan an object with the deflected beam of light deflected from the scanning mirror. Galvanometer controller means is provided for applying a drive signal to the mirror drive means. There is positioned in an optical path of the deflected beam, beam position detection means to generate synchronization pulses when the deflected beam impinges on it. Each beam position detection means comprises a pair of closely located photodetectors and comparator circuit means. Synchronization circuit means is connected to the beam position detection means for handling the synchronization pulses and for applying correction signals to the galvanometer controller means so that the drive signal is properly compensated.

BRIEF DESCRIPTION OF THE DRAWINGS

In a more complete understanding of the present invention and for further objects and advantages, references may be made to the following description taken in conjunction with the accompanying drawings in which.

DETAILED DESCRIPTION OF THE PREFERRED EMBODIMENTS

Figure 1:
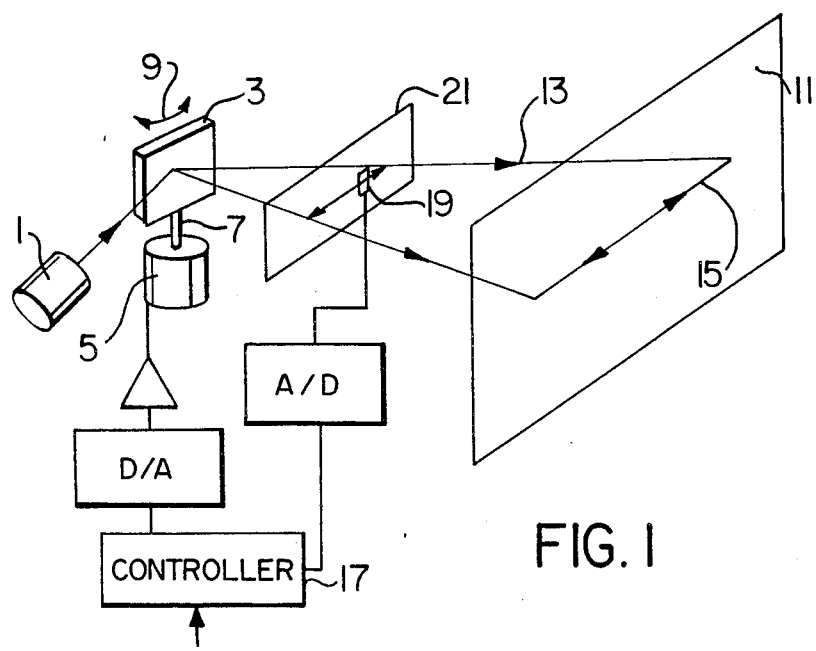
FIG. 1 is a schematic perspective view of the present invention according to one embodiment.

FIG. 1, shows a schematic perspective view of the present invention according to one of its embodiments.

A laser 1 projects a beam of light towards a scanning mirror 3 which is rotatably supported by a mirror drive means 5. The drive means is typically an electric motor or other galvanometric drive means and drives the mirror in an angularly reciprocating fashion about an axis 7 as shown by arrows 9, thereby scanning a scene 11 with a scanned deflected beam 13 along a scanning line 15. The mirror drive means 5 is energized by a drive signal sent thereto from a galvanometer controller 17. The controller 17 can produce a variety of drive signals upon command of a human operator in order to drive the scanning mirror in the desired motion e.g. sinusoidal, sawtooth etc. The embodiment shown in FIG. 1 includes beam position detection means 19, e.g. a photodetector, a photodiode etc. at a predetermined location in an optical path of the scanned deflected beam. A transparent window 21 is provided on a housing (not shown) for passage of the scanned beam and the photodetector or the like is provided thereon.

The photodetector 19 as the beam position detection means generates a synchronization signal in the form of pulses, when the scanned beam impinges upon it as the beam reciprocates. Therefore, the synchronization signal indicates the times when the scanning mirror is precisely at a present angle.

Known galvanometer scanners are often provided with a position sensing mechanism which produces a feedback signal to be applied to a galvanometer controller to improve frequency response of the scanners. In the above-referenced U.S. Pat. No. 4,127,781, a position determining mechanism is taught.

There are always certain errors between the drive signal and the actual position of the mirror which affect accuracy of the galvanometer. These errors are results of factors such as non-linearity, jitter, wobble, zero drift, gain drift, phase variation among others. The precise definitions of these factors are widely known and can be found in reference books.

If one measures these factors one should be able to compensate the position of the mirror precisely to the responsive to the drive signal.

The position sensing mechanism normally gives a high resolution reading of the relative position but the accuracy of the zero and the phase are highly related to temperature. Gain or peak-to-peak amplitude is also affected but on a lesser degree. In order to compensate the two main fluctuations, one needs to know with precision the phase variation $\phi$ and the zero drift (offset) $E_{off}$.

Referring back to FIG. 1, the photodetector 19 produces pulses which, after processing, can give this information with accuracy.

Figure 2A:
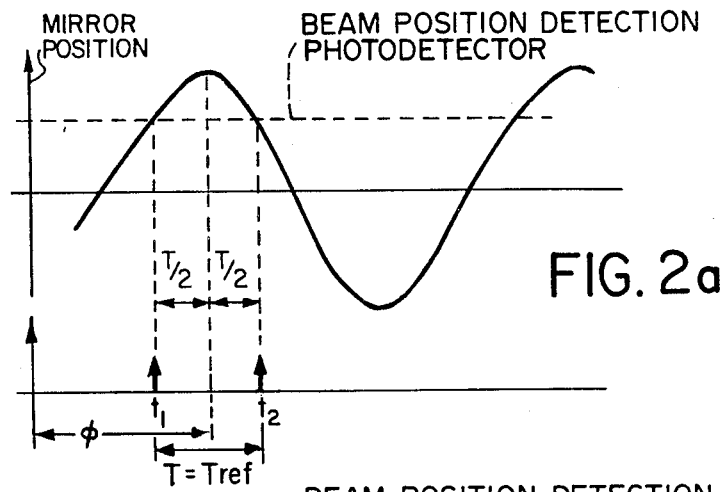
FIGS. 2a, 2b and 2c are graphs showing the relationships of the movement of the mirror and synchronization pulses generated.
Figure 2B:
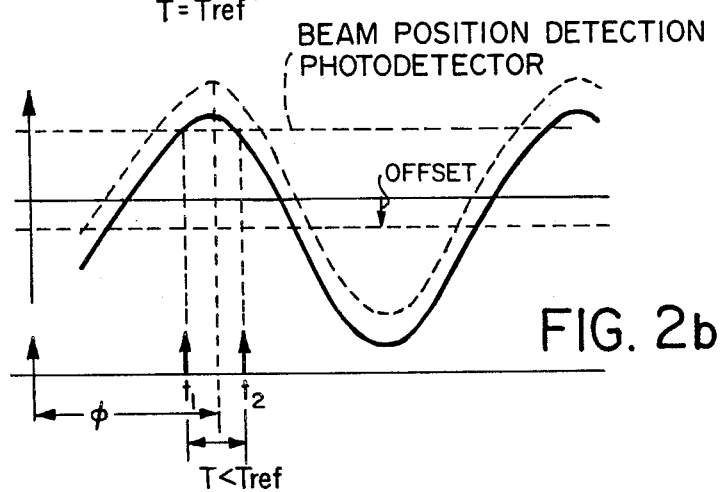
Figure 2C:
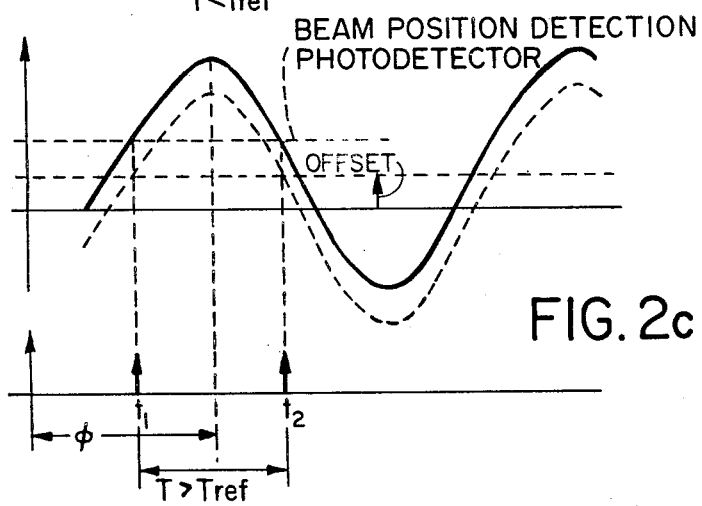

In order to describe the principle of the present invention, reference is made to FIGS. 2a, 2b, and 2c which show the relationships of the actual movement of the mirror and pulses (shown by bold arrows) generated by the photodetector, as the mirror reciprocates. While a sinusoidal movement is illustrated in the figures, other waveforms, such as sawtooth are also possible.

As seen in the figures, when the mirror oscillates, two synchronization pulses are generated in each scanning cycle.

In FIG. 2a, $T_{ref}$ (reference value) is preset and the galvanometer controller is calibrated by a human operator. Under these conditions, the waveform shown in the figure is generated and has no zero drift. During the operation however, the zero position can shift either up or down, resulting in changes in the distance between the pulses as seen in FIGS. 2b and 2c.

The reference value $T_{ref}$ can be set either electronically by adjusting the length of $T_{ref}$ or by mechanically adjusting the position of the beam position detection photodetector. It is also possible to arrange more than one beam position detection photodetector and activate certain one to preset $T_{ref}$. It is therefore also possible to use more than one photodetector in the optical path of the deflected beam and to activate a certain one to function as the beam position detection means to preset $T_{ref}$.

In ideal operation, the distance T between the pulses should be always constant as a preset reference value $T_{ref}$. Because the phase $\phi$ between input and output is small, it is always possible to distinguish one pulse from the other. If an offset (zero drift) is present as in FIGS. 2b and 2c, the distance T increases or decreases, depending upon the direction of the offset. The amount of offset is function of the distance $T = (t_2 - t_1)$.

The phase $\phi$ is also easy to determine. As seen in the figures, the top of the sawtooth is always exactly at the center of the two pulses, thus $$\phi = \frac{t_1 + t_2}{2} - \frac{\pi}{2}$$

By using these measurements, adjustments (compensation) can be effected automatically by the controller as shown in FIG. 1.

Figure 3:
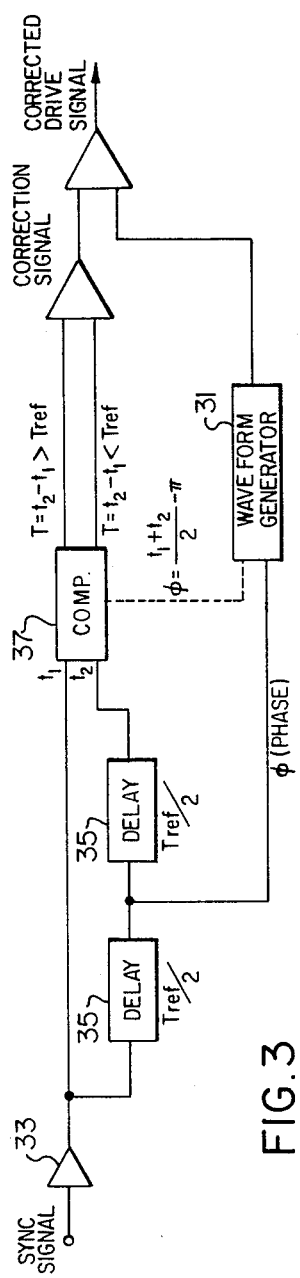
FIGS. 3 and 4 are schematic diagrams of the galvanometer controller and the synchronization circuit means according to different embodiments.

FIG. 3 shows a schematic diagram of galvanometer controller and synchronization circuit means. A waveform generator 31 generates a signal of a desired waveform e.g. sawtooth, sinusoidal ect. for driving the galvanometer drive (motor). The synchronization pulses produced by the beam position detection means are applied to an amplifier 33. The output of the amplifier 33 is time-delayed by preset adjustable delay means 35 which is each normally set at $T_{ref}/2$. The delayed output and the undelayed output are compared by a comparator 37 to produce a correction signal whose polarity and duration indicate the direction and amount of offset (zero drift). This correction signal and the drive signal generated by the waveform generator are combined to produce a corrected drive signal which is applied to the galvanometer drive.

Figure 4:
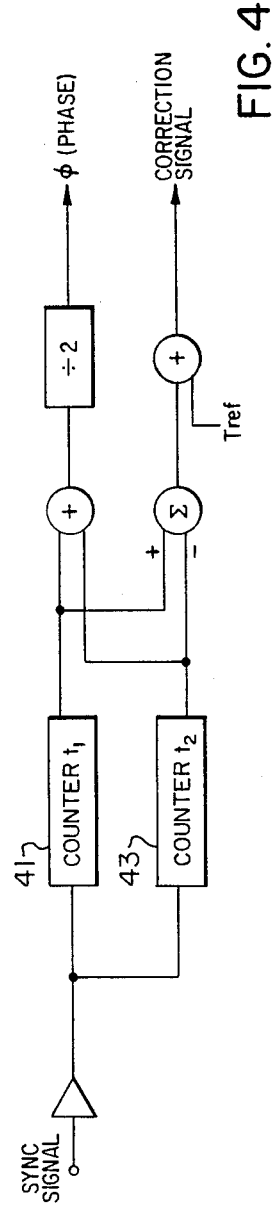

FIG. 4 illustrates another embodiment of the galvanometer controller. In the figure, two counters 41, 43 measures $t_1$ and $t_2$ and these values are processed to generate signals representative of phase $\phi$ and correction signals.

This inventive synchronization technique is not sensitive to mechanical vibrations as the galvanometer and the photodetectors are mechanically very stable and in any case the vibrations do not influence the rotation of the scanning mirror.

The only concern may be the loss of accuracy near the ends of scan when the scan changes it direction. However, this loss is of less importance because the important measurements are carried out in the central region of a scan.

The use of the synchronization pulse in the position detection according to the present invention, on the other hand, has the following further advantages over the known A/D (analog/digital) method.

1. The technique is entirely digital and needs no special calibration and adjustment. It is also noise free.
2. The Zero position is automatically adjusted.

3. The speed of the scanning can be easily changed by a change of the clock frequency. If the sawtooth is generated by an up/down counter and a D/A converter, a programmable divider can be used for this purpose.

4. An increase in the precision of the position sensor will result in a higher resolution then would be in the A/D method.

Figure 5:
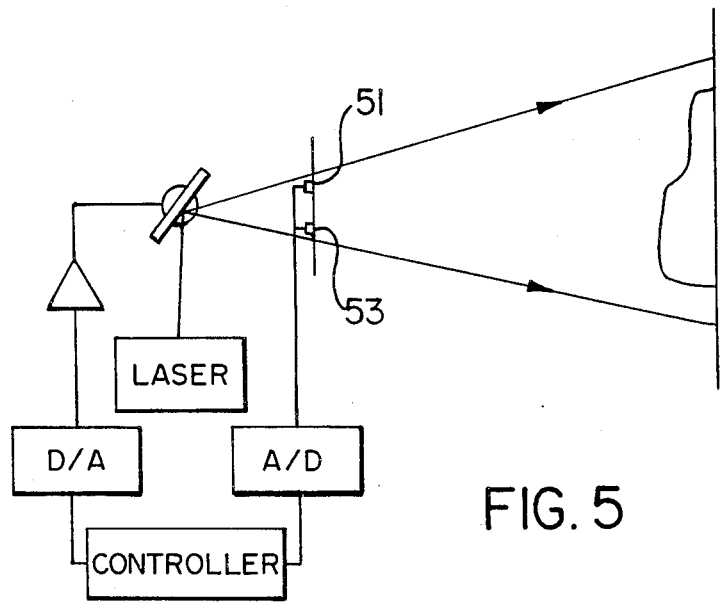
FIGS. 5 and 6 are schematic illustrations of the present invention, according to other embodiments.

Referring to FIG. 5, another embodiment of the present invention includes two beam position detection means 51 and 53, each made of photodetector or the like in the optical path of the scanned beam.

Figure 6:
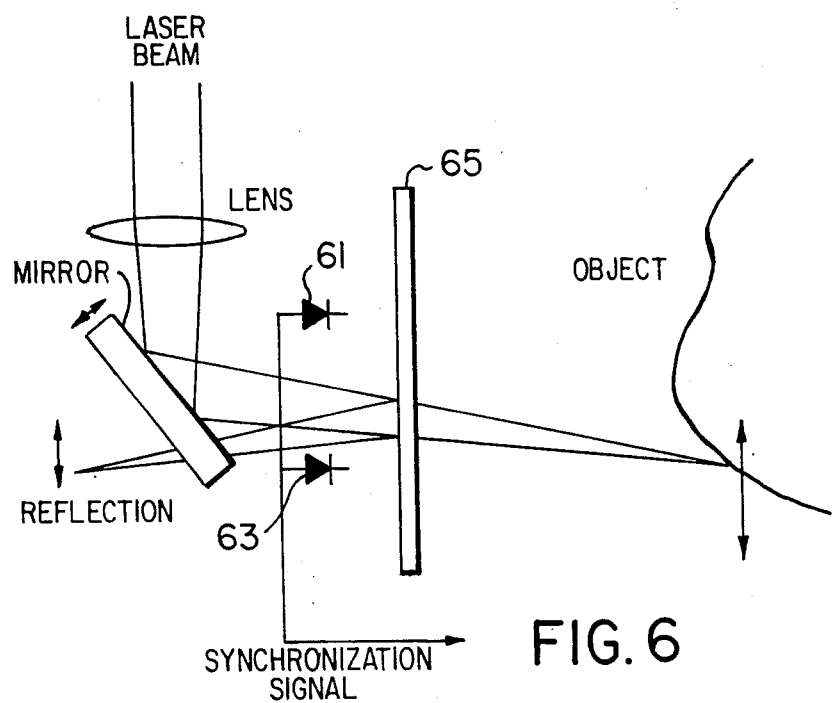

FIGS. 6 shows schematically still another embodiment in which two photodetectors 61, 63, as the beam position detection means are provided in the optical path of a portion of the scanned beam reflected back from a window 65. The photodetectors are positioned at locations to receive the reflected portion of the scanned beam but they do not interfere with the scanned beam.

Figure 7:
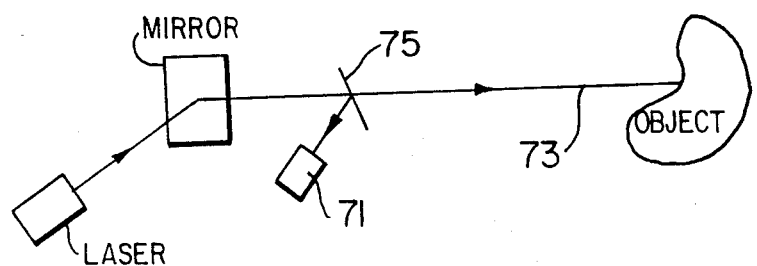
FIG. 7 is a schematic illustration of the present invention showing the arrangement of the window and the photodetector according to still another embodiment.

FIG. 7 is another way of positioning the photodetectors 71 out of the direct path of the scanned beam 73. A window 75 is located at an angle to reflect a portion of the scanned beam towards the photodetectors and at the same time to transmit the scanned beam towards the object.

Figure 8A:
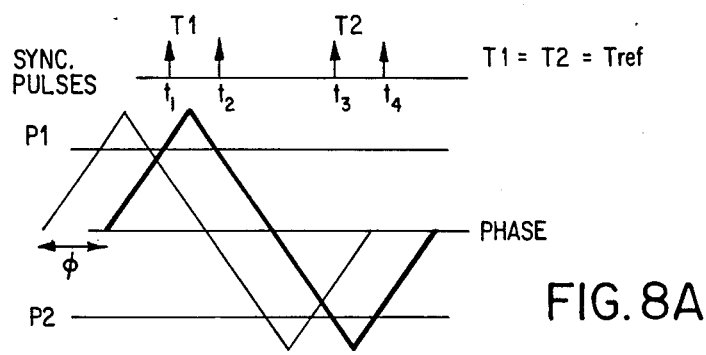
FIG. 8A, 8B and 8C are graphs showing the relationships of the synchronization pulses and the movement of the scanning mirror for the embodiments using two photodetectors.
Figure 8B:
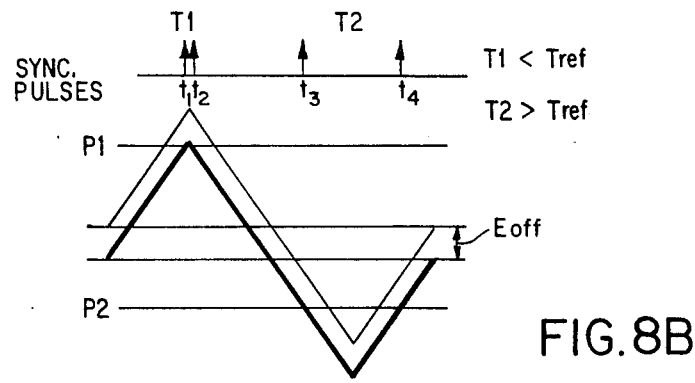
Figure 8C:
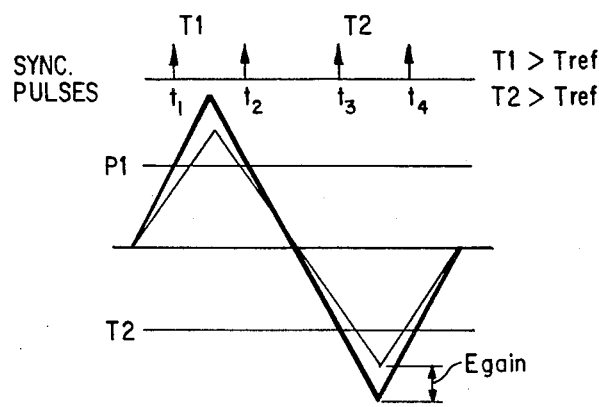

The principle of operation of these embodiments is graphically shown in FIGS. 8A, 8B and 8C in which, sawtooth waveforms for the drive signal is illustrated for the purpose of explanation. Same principle applies to other waveforms without appreciable modifications.

In these figures, $P_1$ and $P_2$ indicates the positions of the two photodetectors which measure $t_1$, $t_2$, $t_3$ and $t_4$ of synchronization pulse by producing corresponding pulses.

Now let $$T_1 = t_2 - t_1$$

$$T_2 = t_4 - t_3$$

When a reference value $T_{ref}$ is preset by a human operator, the galvanometer controller produces a sawtooth waveform shown in FIG. 8A. Under this condition $T_{ref} = T_1 = T_2$.

Then phase $\phi$ is calculated by $$\phi = (t_1 + t_2)/2 - \phi/2$$

or $\phi = (t_3 + t_4)/2 - 3\pi/2$

These equations can be rewritten into, $$\phi = (t_1 + t_2 + t_3 + t_4)/4 - \pi$$

FIGS. 8B shows a graph when an offset $E_{off}$ is present. As seen in the figure, $E_{off}$ is a function of $T_1$ and $T_2$. In fact, it can be expressed as $$E_{off} \simeq T_1 - T_2$$

Upon processing, $E_{off}$ can be applied to the galvanometer controller for correction in the drive signal.

FIGS. 5C, on the other hand, shows a graph when the gain (the amplitude) of the drive signal has fluctuated. This drift in gain also can be measured and applied to the galvanometer controller for correction. It can be expressed as shown below $$E_{gain} \simeq T_1 + T_2 - 2\, T_{ref}$$

It should also be noted that as in the case of the embodiment described above with reference to FIGS. 1, 2a, 2b and 2c, a pair of photodiodes can be mechanically adjusted with respect to location to preset $T_{ref}$. On the other hand, $T_{ref}$ can be electronically preset in the circuit shown in FIGS. 3 and 4. In practice, a mechanical coarse preset and an electronic fine tuning are performed.

Although one or two photodiodes are disclosed in the embodiments, it is also possible to arrange more than two photodiodes so that any of the photodiodes can be activated to produce a similar effect as adjusting the locations of photodiodes.

Figure 9A:
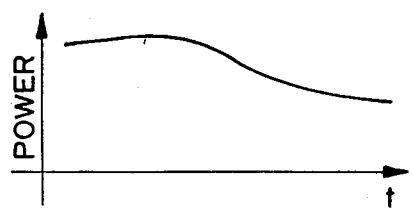
FIG. 9a and 9b are graphs showing changes in laser power and intensity distribution of a laser beam.
Figure 9B:
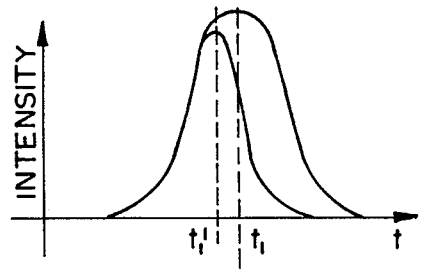

So far, the cross-sectional size of the laser beam and the Gaussian distribution of its intensity have not been taken into consideration. However, in reality, the laser beam has a definite cross-section, in fact large enough to encompass more than one photodetectors arranged in an array. FIG. 6, therefore, illustrates a lens to focus the laser beam at the object which is being scanned. Consequently, the synchronization photodetectors 61 and 63, each produce relatively large pulses, such as the one shown in FIG. 9b in terms of intensity vs. time.

In the actual setup, the pulse position is measured using a peak detection circuit (U.S. Pat. No. 4,658,368 Apr. 14, 1987, Blais) giving good results. However, referring to FIG. 9a, if there are any changes in the power of the laser, which can be the case if the laser source is not stable or if the intensity of the laser is adjusted automatically to compensate for the different reflectivities of the object being measured, the shape of the pulse of the photo-detector signal will be distorted and therefore the peak position will be displaced from $t_1$ to $t_1$, as seen on FIG. 9b. In order to monitor the position of a laser beam precisely independent of the intensity variation, the beam position detection means can be made up of a pair of closely located photodetectors connected to an appropriate electronic circuit.

Figure 10:
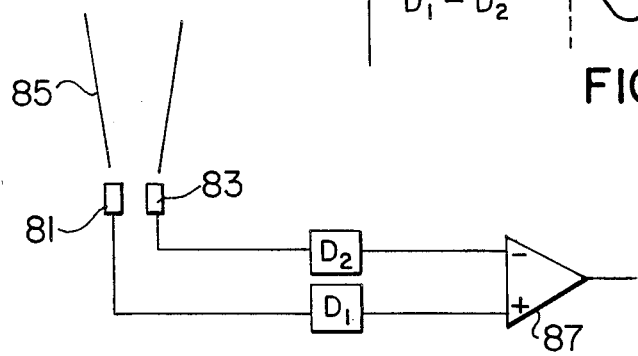
FIG. 10 is a schematic diagram of an embodiment including a pair of closely positioned photodetectors and a zero crossing measuring circuit.

FIG. 10 shows a practical embodiment of the beam position detection circuit using a pair of photodetectors 81 and 83 in the optical path of laser beam 85 which replace each of the two beam position detection means such as photodetectors 61 and 63 shown in FIG. 6. Photodetectors 81 and 83 produce signals $D_1$ and $D_2$. The beam position is measured by comparing the amplitudes of the two signals as the laser beam scans the photodetectors. The zero crossing is simply measured using a comparator 87. The signals $D_1$ and $D_2$ are, for example as shown in FIG. 11 which further illustrates the zero crossing of a differential of the two signals.

Figure 11:
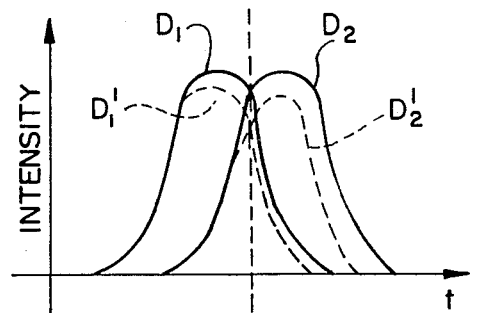
FIG. 11 is graphs showing different intensity distributions of a laser beam and electrical signals of zero crossing measuring circuit.

Referring to FIG. 11, suppose the intensity of the laser beam changed, signals $D_1$ and $D_2$ becomes $D_1'$ and $D_2'$ and differential signal $(D_1 - D_2)$ becomes $(D_1' - D_2')$. However, the zero crossing would not be affected, i.e. always at the midpoint of peaks of $D_1$ and $D_2$. In other words, the differential of $D_1$ and $D_2$ is zero when the center of the laser beam is at the midpoint of the two photodetectors because they produce an identical signal. Any changes in the laser intensity would only alter the amplitudes of the both signals by an identical amount, still indicating the same zero crossing.

The photodetectors 81 and 83 can be made of an array of many photodiodes, phototransistors etc. mounted on the same substrate. The dimension of each detector can vary from a few microns to several millimeters. In case a long array of photodetectors is used, two or more pairs of closely located photodetectors can be electrically selected using multiplexers for example.

This position measurement has the advantage of being independent of the intensity of the laser beam. Thus it can be used in sysems where the intensity is automatically adjusted. This control of the intensity of the laser is particularly interesting in such 3 dimensional vision systems as those shown in the above-referenced U.S. Pat. No. 4,627,734, increasing the dynamic range of measurements (reflected light from the scene).

In addition to galvanometers discussed above, the technique is equally applicable to such electrically controlled devices as motors, resonant scanners etc.

We claim:

1. A galvanometric optical scanning system, comprising:

a scanning mirror rotatably supported on an axis, mirror drive means for driving the said scanning mirror in an angularly reciprocating fashion about the said axis;

a light source for projecting a beam of light towards the scanning mirror to scan an object with the deflected beam of light deflected from the said scanning mirror;

galvanometric controller means for applying a drive signal to the said mirror drive means;

at least two beam position detection means, each including a pair of closely located photodetectors positioned in an optical path of the deflected beam and comparator means for comparing output signals generated by said pairs of photodetectors, to generate synchronization pulses indicative of precise position of the deflected beam as it scans the object;

synchronization circuit means connected to said beam position detection means for handling said synchronization pulses and apply a correction signal to the said galvanometer controller means so that the said drive signal is compensated.

2. The galvanometric optical scanning system, according to claim 1, wherein further comprising:

an optical window positioned between the said scanning mirror and the object to reflect a portion of the deflected beam of light; and the said beam position detection means positioned in an optical path of the said reflected portion of the deflected beam of light to generate synchronization pulses indicative of the position of the deflected beam.

3. The galvanometric optical scanning system according to claim 1, wherein:

the said beam position detection are two in number; and the synchronization circuit means includes processing means for processing the synchronization pulses to generate correction signals indicative of phase variation $\phi$, offset $E_{off}$ and gain drift $E_{gain}$ of the drive signal, according to the following equations:

$$\phi = \frac{t_1 + t_2 + t_3 + t_4}{4} - \pi$$

$$E_{off}[=] \approx T_1 - T_2$$

$$E_{gain}[=] \approx T_1 + T_2 - 2T_{ref}$$

where $t_1$, $t_2$, $t_3$ and $t_4$ are timings of four synchronization pulses in each scan cycle and $$T_1 = t_2 - t_1$$

$$T_2 = t_4 - t_3$$

and $T_{ref}$ is a preset reference value.

4. The galvanometric optical scanning system according to claim 2, wherein:

the said beam position detection are two in number; and the synchronization circuit means includes processing means for processing the synchronization pulses to generate correction signals indicative of phase variation $\phi$, offset $E_{off}$ and gain drift $E_{gain}$ of the drive signal, according to the following equations:

$$\phi = \frac{t_1 + t_2 + t_3 + t_4}{4} - \pi$$

$$E_{off}[=] \approx T_1 - T_2$$

$$E_{gain}[=] \approx T_1 + T_2 - 2T_{ref}$$

where $t_1$, $t_2$, $t_3$ and $t_4$ are timings of four synchronization pulses in each scan cycle and $$T_1 = t_2 - t_1$$

$$T_2 = t_4 - t_3$$

and $T_{ref}$ is a preset reference value.

5. The galvanometric optical scanning system, according to claim 3, wherein: the said two beam position detection means comprise a plurality of photodetectors, any two of closely located pairs of which can be activated to adjust the locations of the said beam position detection means.

6. The galvanometric optical scanning system, according to claim 4, wherein:

the said two beam position detection means comprise a plurality of photodetectors, any two of closely located pairs of which can be activated to adjust the locations of the said synchronization photodetector means.

7. The galvanometric optical scanning system, according to claim 3, wherein:

the said pair of closely located photodetectors in each of the said two beam position detection means are adjustable as to their locations.

8. The galvanometric optical scanning system, according to claim 4, wherein:

the said pair of closely located photodetectors in each of the said two beam position detection means are adjustable as to their locations.

* * * * *